United States Patent
Yun et al.

(10) Patent No.: US 7,894,976 B2
(45) Date of Patent: Feb. 22, 2011

(54) LIGHT LOAD AND IDLE HCCI COMBUSTION CONTROL BY FUEL PRESSURE MODIFICATION

(75) Inventors: Hanho Yun, Oakland Township, MI (US); Nicole Wermuth, Ann Arbor, MI (US); Barry L. Brown, Lake Orion, MI (US); Jun-Mo Kang, Ann Arbor, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/431,805

(22) Filed: Apr. 29, 2009

(65) Prior Publication Data

US 2009/0272362 A1    Nov. 5, 2009

Related U.S. Application Data

(60) Provisional application No. 61/049,936, filed on May 2, 2008.

(51) Int. Cl.
*F02M 7/28* (2006.01)
(52) U.S. Cl. .................. 701/110; 123/435; 123/436; 73/114.43
(58) Field of Classification Search ......... 701/103–105, 701/110; 123/435–436, 492; 73/35.12, 114.18, 73/114.43, 114.51
See application file for complete search history.

(56) References Cited

U.S. PATENT DOCUMENTS

| 6,328,014 | B1* | 12/2001 | Bradshaw .................. 123/300 |
| 6,578,555 | B2* | 6/2003 | Sykes ........................ 123/479 |
| 6,912,989 | B2 | 7/2005 | Tayama et al. |
| 7,717,088 | B2* | 5/2010 | Thomas ..................... 123/478 |
| 2006/0219214 | A1 | 10/2006 | Okude et al. |
| 2009/0164104 | A1 | 6/2009 | Wermuth et al. |
| 2009/0205612 | A1 | 8/2009 | Wermuth et al. |
| 2009/0272363 | A1 | 11/2009 | Yun et al. |

FOREIGN PATENT DOCUMENTS

EP    1348854 A1    10/2003
EP    1681452 A1    7/2006

OTHER PUBLICATIONS

U.S. Appl. No. 12/408,816, Not Pub'd, Yun et al.
U.S. Appl. No. 12/395,747, Not Pub'd, Yun et al.

* cited by examiner

*Primary Examiner*—Hai H Huynh

(57) ABSTRACT

A method for controlling a homogeneous-charge compression-ignition capable engine, operating with spray-guided spark ignition stratified combustion at low load, includes monitoring a speed of the engine, monitoring a load of the engine, determining a desired fuel pressure based upon the speed of the engine and the load of the engine, and utilizing the desired fuel pressure to control fuel injection into the engine, wherein the desired fuel pressure is calibrated to the speed and the load based upon increased stability of the engine at lower fuel pressures and lower soot emissions from the engine at higher fuel pressures.

17 Claims, 13 Drawing Sheets

LIGHT LOAD AND IDLE HCCI COMBUSTION CONTROL BY FUEL PRESSURE MODIFICATION

CROSS REFERENCE TO RELATED APPLICATIONS

This application claims the benefit of U.S. Provisional Application No. 61/049,936 filed on May 2, 2008, which is hereby incorporated herein by reference.

TECHNICAL FIELD

This disclosure is related to spark-ignited, direct injection (SIDI), homogeneous-charge compression-ignition (HCCI) capable, internal combustion engines.

BACKGROUND

The statements in this section merely provide background information related to the present disclosure and may not constitute prior art.

Internal combustion engines, especially automotive internal combustion engines, generally fall into one of two categories—spark ignition engines and compression-ignition engines. Traditional spark ignition engines, such as gasoline engines, are known to function by introducing a fuel/air mixture into the combustion cylinders, which is then compressed in the compression stroke and ignited by a spark plug. Traditional compression-ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as HCCI combustion. HCCI combustion, also referred to as controlled auto-ignition combustion, comprises a distributed, flameless, auto-ignition combustion process that is controlled by oxidation chemistry, rather than by fluid mechanics. In an engine operating in the HCCI combustion mode, the intake charge is nearly homogeneous in composition, temperature, and residual level at intake valve closing time. Because controlled auto-ignition is a distributed kinetically-controlled combustion process, the engine operates at a very dilute fuel/air mixture (i.e., lean of a fuel/air stoichiometric point) and has a relatively low peak combustion temperature, thus forming extremely low $NO_x$ emissions. The fuel/air mixture for controlled auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the controlled auto-ignition combustion mode can operate unthrottled to achieve diesel-like fuel economy.

In an HCCI engine, combustion of a cylinder charge is flameless, and occurs spontaneously throughout the entire combustion chamber volume. The homogeneously mixed cylinder charge is auto-ignited as the cylinder charge is compressed and its temperature increases.

The combustion process in an HCCI engine depends strongly on factors such as cylinder charge composition, temperature, and pressure at the intake valve closing. These factors are impacted by current and recent engine operating states establishing residual energy present within the combustion chamber at the time of intended combustion. Engine operating state is frequently estimated by engine speed and engine load. Because HCCI combustion is particularly sensitive to in-cylinder conditions, the control inputs to the engine, for example, fuel mass and injection timing and intake/exhaust valve profile, must be carefully coordinated to ensure robust auto-ignition combustion.

Generally, for best fuel economy, an HCCI engine operates unthrottled and with a lean air-fuel mixture. Further, in an HCCI engine using exhaust recompression valve strategy, the cylinder charge temperature is controlled by trapping different amount of the hot residual gas from the previous cycle by varying the exhaust valve close timing. The opening timing of the intake valve is delayed preferably symmetrical to the exhaust valve closing timing relative to TDC intake. Both the cylinder charge composition and temperature are strongly affected by the exhaust valve closing timing. In particular, more hot residual gas from a previous cycle can be retained with earlier closing of the exhaust valve which leaves less room for incoming fresh air mass. The net effects are higher cylinder charge temperature and lower cylinder oxygen concentration. In the exhaust recompression strategy, the exhaust valve closing timing and the intake valve opening timing are measured by the Negative Valve Overlap (NVO) defined as the duration in crank angle between exhaust valve closing and intake valve opening.

In addition to a valve control strategy, there must be a suitable fuel injection strategy for stable combustion. For example, at a low fueling rate (for example, fueling rate<7 mg/cycle at 1000 rpm in an exemplary 0.55 liter combustion chamber), the cylinder charge may not be hot enough for a stable auto-ignited combustion in spite of the highest value of NVO allowed, leading to a partial-burn or misfire. One way to increase the charge temperature is to pre-inject a small amount of fuel when the piston approaches TDC intake during the NVO recompression. A portion of the pre-injected fuel reforms due to high pressure and temperature during the recompression, and releases heat energy, increasing the cylinder charge temperature enough for successful auto-ignited combustion of the combustion charge resulting from the subsequent main fuel injection. The amount of such auto-thermal fuel reforming is based upon the pre-injection mass and timing, generally with fuel reforming increasing with earlier pre-injection timing and greater pre-injection fuel mass.

Excessive fuel reforming decreases the overall fuel economy, and lack of fuel reforming may result in combustion instability. Thus, effective control of the reforming process benefits from accurate estimations of reforming. A method is known that estimates the amount of fuel reforming using the unique characteristic of Universal Exhaust Gas Oxygen (UEGO) sensor. A control strategy is also known to indirectly control the amount of fuel reforming in an HCCI engine by monitoring engine operating conditions including intake mass air flow and exhaust air/fuel ratio, controlling negative valve overlap to control intake airflow to achieve a desired actual air-fuel ratio for a given fueling rate, and adjusting timing of pre-injection of fuel to control the measured air-fuel ratio to a desired second air/fuel ratio smaller than the desired actual air-fuel ratio. Another method for controlling an amount of fuel reforming includes measuring in-cylinder pressures during a current combustion cycle, estimating fuel mass reformed in the current cycle based on the in cylinder pressures, utilizing the estimate of fuel mass reformed in the current cycle to project reforming required in a next cycle, and effecting control over the next cycle based on the projected reforming required in the next cycle.

At medium engine speed and load, a combination of valve profile and timing (e.g., exhaust recompression and exhaust re-breathing) and fueling strategy has been found to be effective in providing adequate heating to the cylinder charge so that auto-ignition during the compression stroke leads to stable combustion with low noise. One of the main issues in effectively operating an engine in the auto-ignition combustion mode has been to control the combustion process properly so that robust and stable combustion resulting in low emissions, optimal heat release rate, and low noise is achieved over a range of operating conditions.

A spark-ignition, direct-injection engine capable of operating in controlled auto-ignition combustion mode transitions between operating in an auto-ignited combustion mode at part-load and lower engine speed conditions and in a conventional spark-ignited combustion mode at high load and high speed conditions. There is a need to have a smooth transition between the two combustion modes during ongoing engine operation, in order to maintain a continuous engine output torque and prevent any engine misfires or partial-burns during the transitions These two combustion modes require different engine operation to maintain robust combustion. One aspect of engine operation includes control of the throttle valve. When the engine is operated in the auto-ignited combustion mode, the engine control comprises lean air/fuel ratio operation with the throttle wide open to minimize engine pumping losses. In contrast, when the engine is operated in the spark-ignition combustion mode, the engine control comprises stoichiometric air/fuel ratio operation, with the throttle valve controlled over a range of positions from 0% to 100% of the wide-open position to control intake airflow to achieve stoichiometry.

In engine operation, the engine air flow is controlled by selectively adjusting position of the throttle valve and adjusting opening and closing of intake valves and exhaust valves. Adjusting the opening, and subsequent closing, of intake and exhaust valves primarily takes the form of: phasing of opening (and subsequent closing) of the valves in relation to piston and crankshaft position; and, magnitude of the lift of the valves' opening. On engine systems so equipped, opening and closing of the intake valves and exhaust valves is accomplished using a variable valve actuation (VVA) system that may include cam phasing and a selectable multi-step valve lift, e.g., multiple-step cam lobes which provide two or more valve lift profiles. In contrast to the continuously variable throttle position, the change in valve profile of the multi-step valve lift mechanism is a discrete change, and not continuous. When a transition between steps in the selectable multi-step valve lift is not effectively controlled, unwanted disturbances in engine air flow can occur, resulting in poor combustion, including misfire or partial-burns.

HCCI combustion encompasses a lean, distributed, flameless, auto-ignition combustion process resulting in potential benefits when an engine is operating in a range of HCCI capable engine speeds and loads, as described above. However, operation of HCCI combustion is not accomplished under a fixed engine control strategy, but rather ranges of control strategies can accomplish HCCI combustion with different operational results. Also, in addition to the above mentioned valve control and fuel injection strategies, other techniques are known to benefit engine operation and extend the operability range to lower loads and temperatures, including combustion chamber designs, and different valve control and ignition strategies. Although these different technologies extend the operational limits of an HCCI engine, all have a lower operability limit where the combustion cycle is too cold to achieve auto-ignition. Additionally, each control strategy has preferred ranges of operation, and each has positive and negative aspects in comparison to other valve control and fuel injection strategies. A particular control strategy operating satisfactorily in a particular engine operating range can produce excess NOx emissions or result in unstable combustion in another particular engine operating range. An engine, operating in a range of engine speeds and loads and optimizing factors such as fuel consumption, reduction of emissions, and combustion stability can switch between control strategies depending upon engine operating conditions and balancing priorities.

HCCI modes and associate auto-ignition of the air fuel change in the combustion chamber is dependent upon conditions within the chamber. Engine stability in HCCI modes in an engine operating at low loads can be difficult to maintain. A method to improve engine stability at low loads would be beneficial.

SUMMARY

A method for controlling a spark-ignited, direct injection, homogeneous-charge compression-ignition capable, internal combustion engine operating with spray-guided spark ignition stratified combustion at low load, including selectively utilizing lowered fuel pressure in a fuel injection system to increase combustion stability includes monitoring a speed of the engine, monitoring a load of the engine, determining a desired fuel pressure based upon the speed of the engine and the load of the engine, and utilizing the desired fuel pressure to control fuel injection into the engine. The desired fuel pressure is calibrated to the speed and the load based upon increased stability of the engine at lower fuel pressures and lower soot emissions from the engine at higher fuel pressures.

BRIEF DESCRIPTION OF THE DRAWINGS

One or more embodiments will now be described, by way of example, with reference to the accompanying drawings, in which:

FIG. 16 illustrates exemplary test data regarding NOx emissions for a range of engine speeds and loads, with regions defined for a first, second, and third multiple-injection, multiple-ignition combustion mode;

FIG. 17 illustrates exemplary test data regarding combustion stability as measured by standard deviation of IMEP for a range of engine speeds and loads, with regions defined for a first, second, and third multiple-injection, multiple-ignition combustion mode;

FIG. 20 graphically depicts exemplary in-cylinder pressures measured through sequential combustion cycles at low engine load utilizing different injection pressures;

FIG. 21 graphically depicts exemplary PMEP measured through sequential combustion cycles at low engine load utilizing different injection pressures;

DETAILED DESCRIPTION

Figure 1:
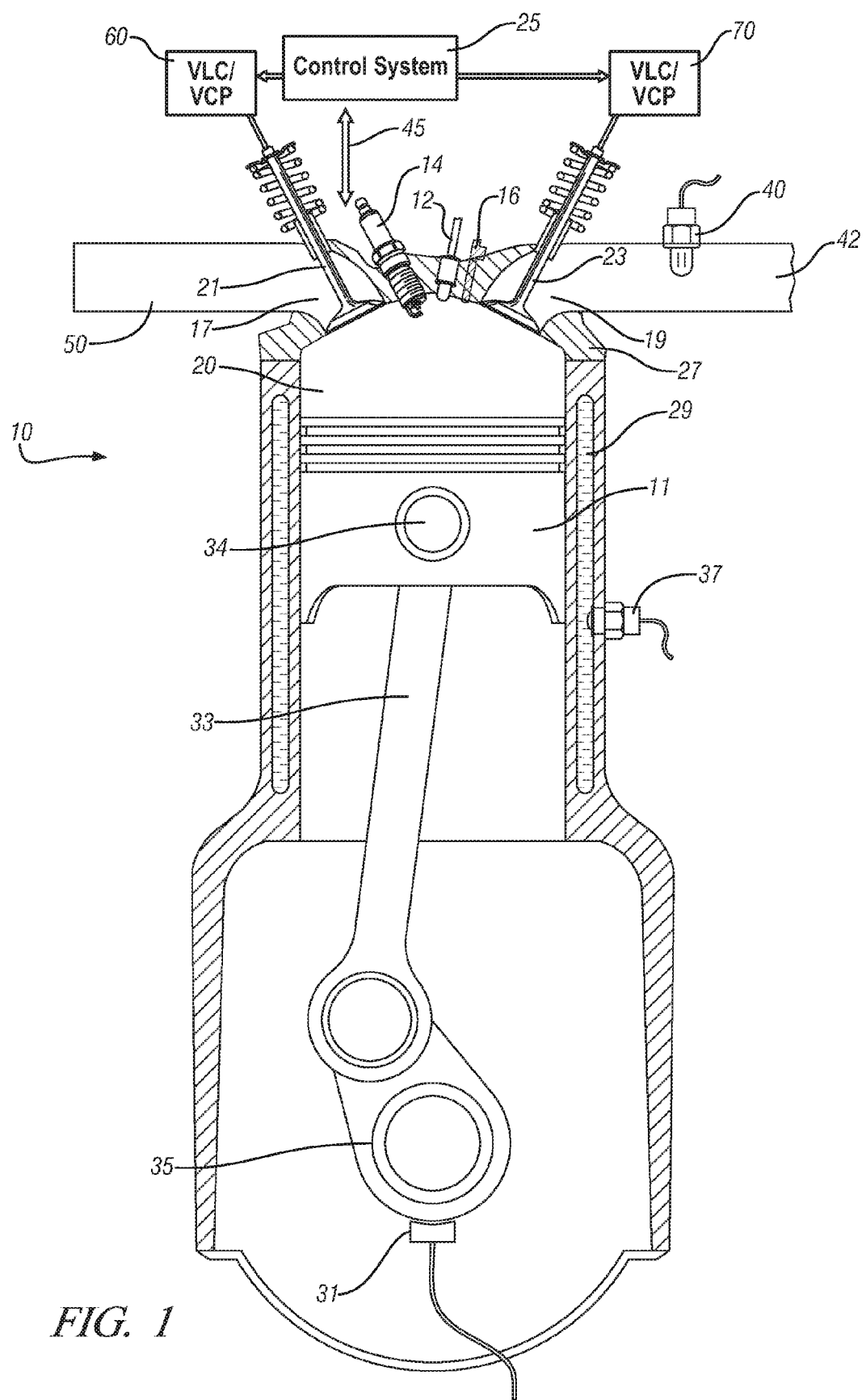
FIG. 1 schematically depicts an exemplary internal combustion engine and a control system which has been constructed in accordance with an embodiment of the present disclosure.

Referring now to the drawings, wherein the showings are for the purpose of illustrating certain exemplary embodiments only and not for the purpose of limiting the same, FIG. 1 schematically depicts an internal combustion engine 10 and control system 25 which has been constructed in accordance with an embodiment of the present disclosure. The engine is selectively operative in a plurality of combustion modes, described hereinbelow with reference to FIG. 2. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition (HCCI) mode. However, as will be appreciated by one having ordinary skill in the art and as noted above, engine embodiments of many different configurations can benefit from the methods of the present disclosure, and the disclosure is not intended to be limited to the exemplary embodiments described herein.

In the present exemplary exposition of the disclosure, a naturally aspirated, a four-stroke, single cylinder, 0.55 liter, controlled auto-ignition, gasoline direct injection fueled internal combustion engine having a compression ratio of substantially 12 to 13 was utilized in implementing the valve and fueling controls and acquisition of the various data embodied herein. Unless specifically discussed otherwise, all such implementations and acquisitions are assumed to be carried out under standard conditions as understood by one having ordinary skill in the art.

The exemplary engine 10 includes a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a signal input to the control system 25 useable to control the engine. The engine preferably includes known systems including an external exhaust gas recirculation (EGR) valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control (VLC) and variable cam phasing (VCP). The VCP device is operative to control timing of opening or closing of each intake valve and each exhaust valve relative to rotational position of the crankshaft and opens each valve for a fixed crank angle duration. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide values for the exhaust gas feedstream, including air/fuel ratio, or measurement of exhaust gas constituents, e.g. NOx, CO, HC, and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as an input to the control system 25. These inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control affecting, for example, fuel economy, emissions, performance, and drivability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network (LAN) bus (not shown) which preferably allows for structured communication of control parameters and commands between various controllers.

The control system 25 is operably connected to the engine 10, and functions to acquire data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine temperature, as indexed by methods such as monitoring engine coolant temperature, oil temperature, or metal temperature; crankshaft rotational speed (RPM) and position; manifold absolute pressure; ambient air flow and temperature; and ambient air pressure. Combustion performance measurements may include measured and inferred combustion parameters, including air/fuel ratio, location of peak combustion pressure, among others.

Actuators controlled by the control system 25 include: fuel injectors 12; the VCP/VLC valve actuation devices 60, 70; spark plug 14 operably connected to ignition modules for controlling spark dwell and timing; EGR valve (not shown), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g., during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Control system 25 has a set of control algorithms, comprising resident program instructions and calibrations stored in ROM.

Algorithms for engine control are typically executed during preset loop cycles such that each algorithm is executed at least once each loop cycle. Algorithms stored in the non-volatile memory devices are executed by the control system and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

The engine is designed to operate un-throttled on gasoline or similar fuel blends with controlled auto-ignition combustion over an extended range of engine speeds and loads. However, spark ignition and throttle-controlled operation may be utilized with conventional or modified control methods under conditions not conducive to the auto-ignition operation and to obtain maximum engine power to meet an operator torque request. Fueling preferably comprises direct fuel injection into the each of the combustion chambers. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in accordance with the present disclosure.

Figure 2:
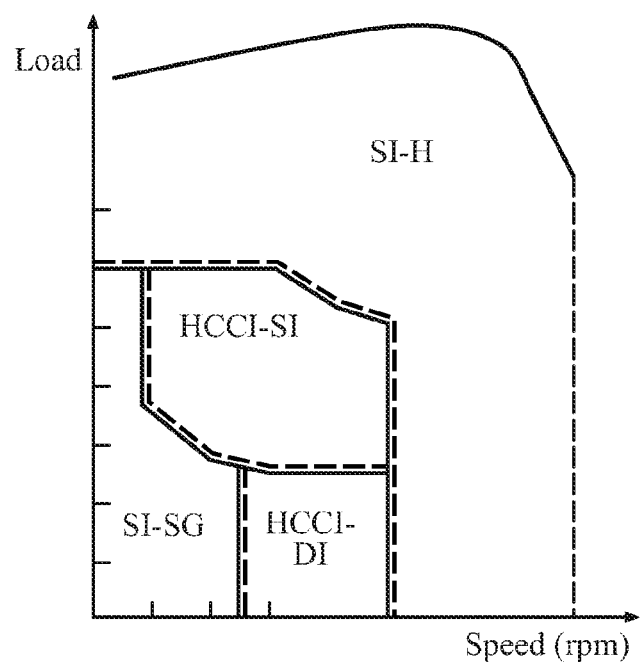
FIG. 2 graphically represents exemplary speed/load related combustion modes, in accordance with the present disclosure.

As aforementioned, FIG. 2 graphically represents an exemplary speed/load related combustion mode. Speed and load are derivable from engine operating parameters such as from the crank sensor and from engine fuel flow or manifold pressure, in accordance with the present disclosure. The engine combustion modes comprise a spray-guided spark-ignition (SI-SG) mode, a single injection auto-ignition (HCCI-SI) mode, and double injection auto-ignition (HCCI-DI) mode, and a homogeneous spark-ignition (SI-H) mode. A preferred speed and load operating range for each of the combustion modes is based upon engine operating parameters, including combustion stability, fuel consumption, emissions, engine torque output, and others. Boundaries which define the preferred speed and load operating ranges to delineate the combustion modes are typically determined during pre-production engine calibration and development, and are executed in the engine control module. For example, as described above, operation in single injection HCCI combustion modes is not desirable below certain engine speeds and loads because insufficient heat is present in the combustion chamber to reliably create auto-ignition. Similarly, operation in HCCI modes is not possible above certain engine speeds and loads because excessive heat is present in the combustion chamber, resulting in combustion issues such as ringing. Operation at low engine speeds and loads is known to be accommodated by either double-injection HCCI combustion modes, taking advantage of recompression and reforming as described above to extend auto-ignition, or spray-guided stratified SI combustion modes, utilizing a spark to ignite a charge concentration within the combustion chamber while incurring inefficiencies in comparison to operating in HCCI modes. Thus, an engine can be operated to take advantage of known beneficial engine combustion modes through a range of engine speeds and loads.

Figures 3A, 3B:
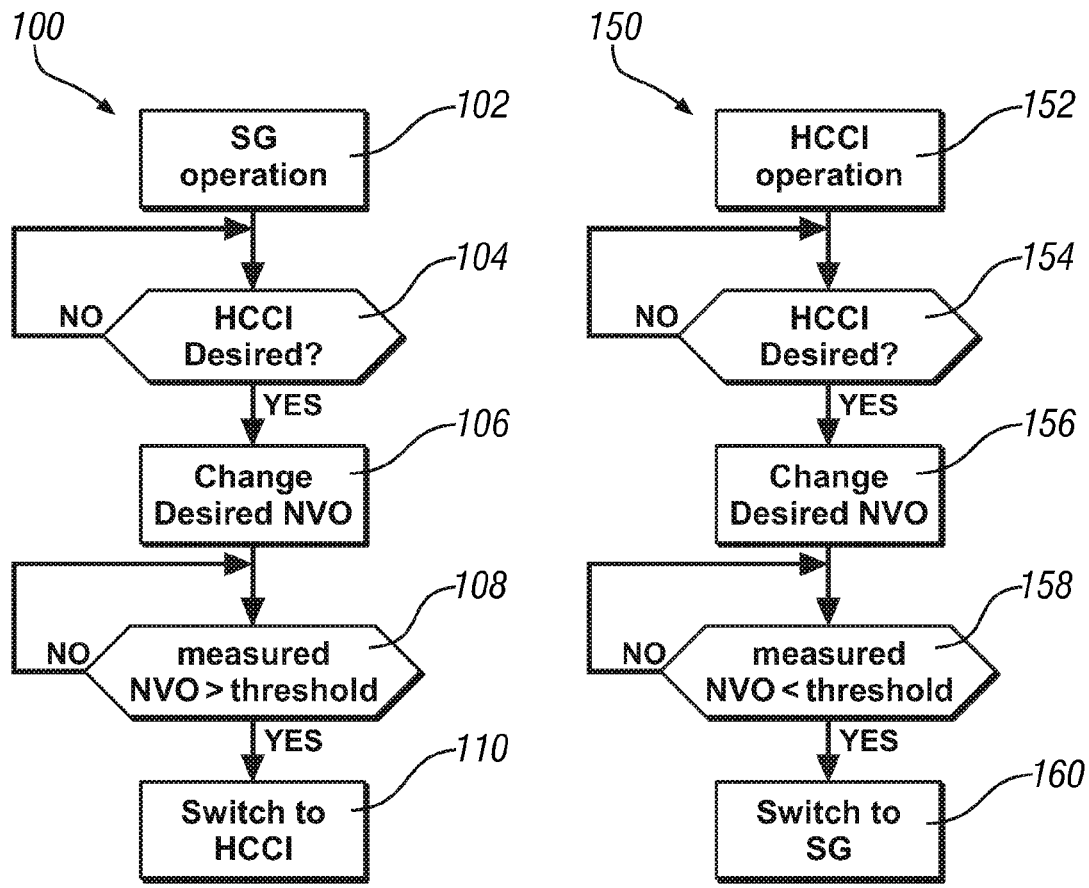
FIGS. 3A and 3B depict methods for controlling transition between a spray-guided spark ignition combustion mode and a homogeneous-charge compression-ignition combustion mode, in accordance with the present disclosure.

FIGS. 3A and 3B depict flowcharts exemplifying a method for controlling transition between the SI-SG (SG) combustion mode and HCCI combustion mode, in accordance with the present disclosure. Less NVO is commanded when operating in the SI-SG combustion mode than when operating in the HCCI combustion mode, for reasons including less requirement for reformates in the combustion chamber. In transitioning between the HCCI and SI-SG combustion modes, there is a time lag, a finite time period, during which the VCP devices move to desired positions.

According to the exemplary method illustrated in FIG. 3A, process 100 is described, wherein when the engine is operating in the SG combustion mode (102) and the control module commands a change to the HCCI combustion mode (104), the control module commands the VCP devices to change to the desired NVO prior to commanding operation in the HCCI combustion mode (106). This includes monitoring the NVO and comparing it to a threshold value, preferably the commanded overlap, (108) prior to commanding operation in the HCCI mode (110). This operation is conducted in order to maintain combustion stability during the transition to HCCI, as combustion in the SI-SG mode is more stable and robust over the range of negative valve overlap at which HCCI operation can command.

Further according to this exemplary method illustrated in FIG. 3B, process 150 is described, wherein when the engine is in the HCCI combustion mode (152), and the control module commands a change to the SI-SG combustion mode (154), the control module commands the VCP to change toward the desired NVO prior to commanding a change in operation to the SI-SG combustion mode (156). In this transition, the measured NVO is compared to a threshold NVO (158). The threshold NVO comprises an NVO at which operation in either the HCCI combustion mode or the SI-SG combustion mode is feasible for the engine system. When the measured NVO is less than the threshold NVO, the engine operation is commanded from the HCCI combustion mode to the SI-SG combustion mode (160). Using this strategy, combustion will continue during transitions and the transitions will be transparent to a vehicle operator.

As described above, SI-SG and HCCI-DI combustion modes are used to operate an engine at engine speeds and loads below which typical HCCI-SI would be possible. However, operation in a known SI-SG combustion mode excludes many of the benefits apparent in lean, auto-ignition HCCI combustion modes. Additionally, testing has shown benefits and drawbacks to operating under some known HCCI combustion modes under certain engine conditions. Results of exemplary testing and the balance between benefits and drawbacks are detailed herein.

Figure 4:
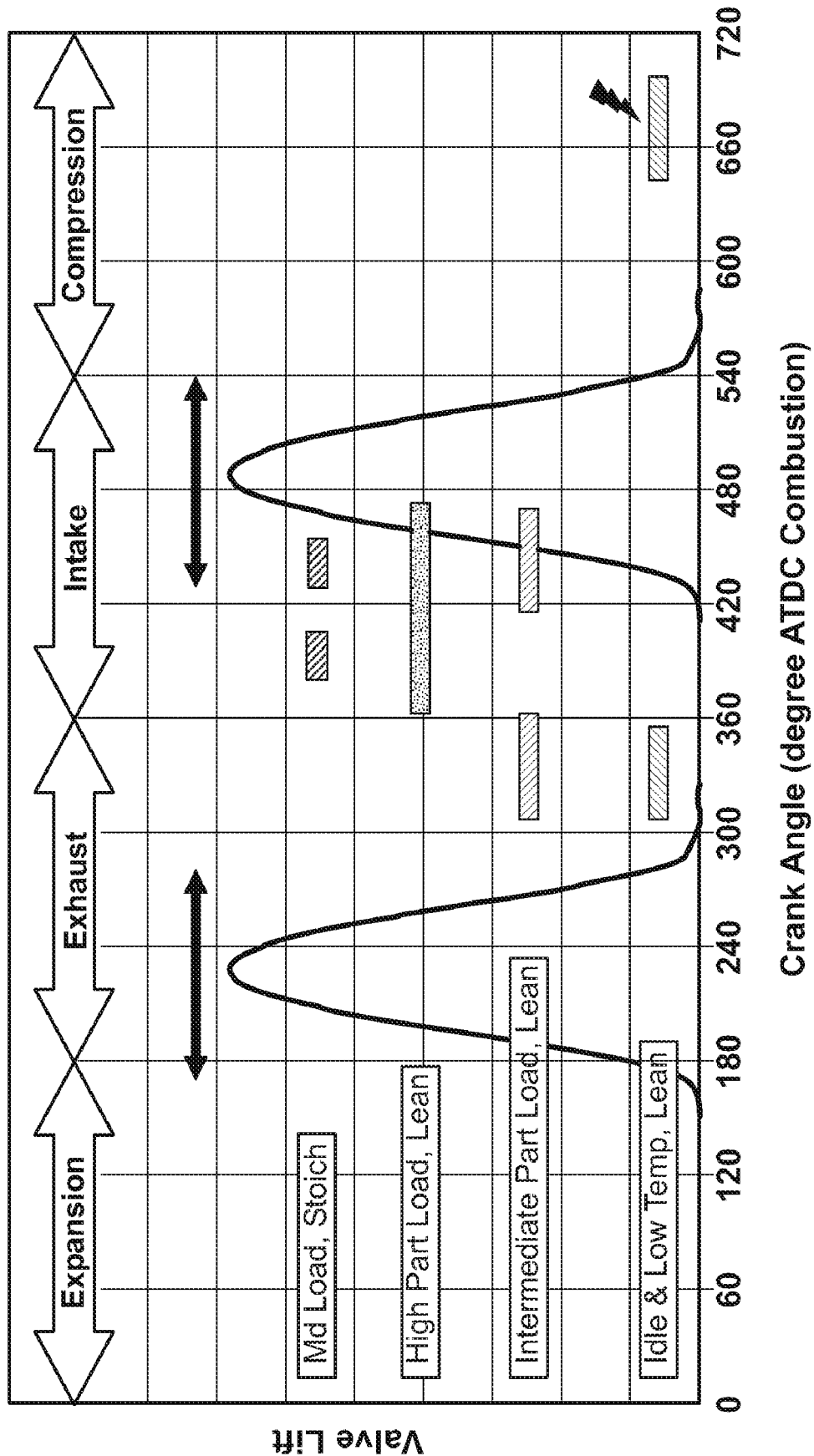
FIG. 4 illustrates an exemplary engine cycle in a four stroke internal combustion engine, including details regarding injection events, ignition events, and valve lift for a number of load related combustion modes, in accordance with the present disclosure.

As FIG. 4 illustrates, an engine cycle in a four stroke internal combustion engine is composed of four phases: (1) expansion; (2) exhaust; (3) intake; and (4) compression. During NVO, the recompression phase begins when the exhaust valve is closed up until the piston is at TDC. After the piston retreats from TDC, recompression has ended and the combustion chamber begins to expand.

FIG. 4 is also a graphical illustration of valve and fueling strategies for different engine loads. Known HCCI combustion, as mentioned above, occurs without a spark by compressing the fuel air mixture to a point of auto-ignition. However, FIG. 4 demonstrates an additional strategy whereby a sparkplug, glow plug, or other source of ignition is utilized to assist combustion in cases where cylinder conditions are too cold to support stable auto-ignition (e.g. low load operation).

The present disclosure sets forth a combination of multiple injections and multiple spark strategies coupled with monitoring and controlling the combustion performance to further extend the low load operating limit of controlled auto-ignition combustion. During a high part load, only one injection is necessary for robust auto-ignition. For intermediate part loads where gas temperature and pressure are high, split injection with large NVO is utilized where a part of the total required fuel per cycle is injected during the recompression phase. The injected fuel goes through partial oxidation or reforming reaction to produce extra heat for improved auto-ignition.

For lower loads, and thus lower cylinder temperatures, reforming a portion of the fuel during recompression may not be enough to trigger auto-ignition. In this operating range, (e.g. near idle operation) the main part of the fuel mass is injected late in the compression stroke rather than during the intake stroke. This stratified part of the fuel is ignited by a spark and compresses the remaining fuel-air mixture further to reach auto-ignition.

Figure 5:
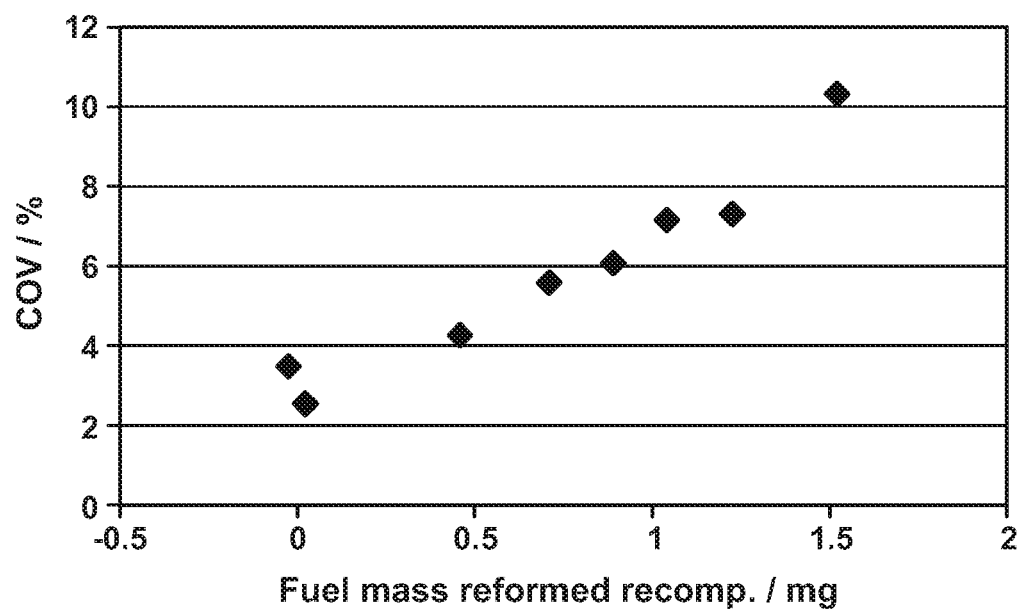
FIG. 5 graphically depicts a correlation between a fuel mass burned during reforming and combustion stability, in accordance with the present disclosure.
Figure 6:
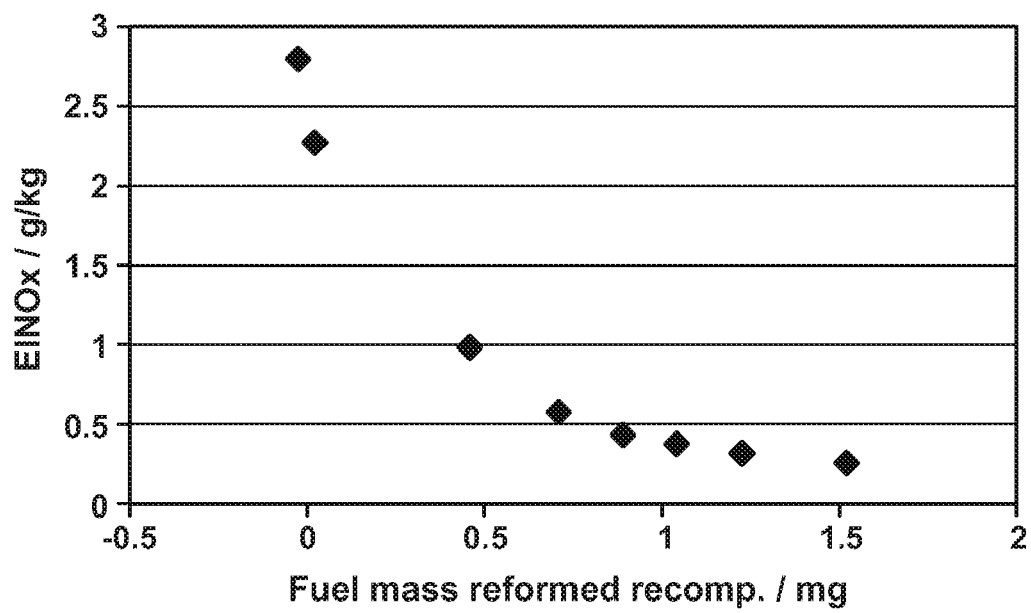
FIG. 6 graphically depicts a correlation between a fuel mass burned during reforming and NOx emissions produced in the combustion process, in accordance with the present disclosure.

In a two injections per engine cycle per cylinder strategy, there is a trade-off between combustion stability and NOx emissions. FIG. 5 graphically depicts exemplary data showing an inverse relationship between fuel mass burned during reforming and combustion stability, in accordance with the present disclosure. IMEP, or indicated mean effective pressure, is a measure of the work being done by the cylinder per combustion cycle. COV of IMEP, a measure of variability in IMEP, is an indicator of combustion stability, with higher values of COV of IMEP indicating greater instability in the combustion process. As shown in the data, greater amounts of fuel reformed in the recompression/negative valve overlap portion of the combustion cycle result in greater instability in the cycle. FIG. 6 graphically depicts exemplary data showing a relationship between fuel mass burned during reforming and reduced NOx emissions, in accordance with the present disclosure. As more fuel is reformed during recompression, NOx emissions are desirably reduced; however, the COV of IMEP is undesirably higher.

Figure 8:
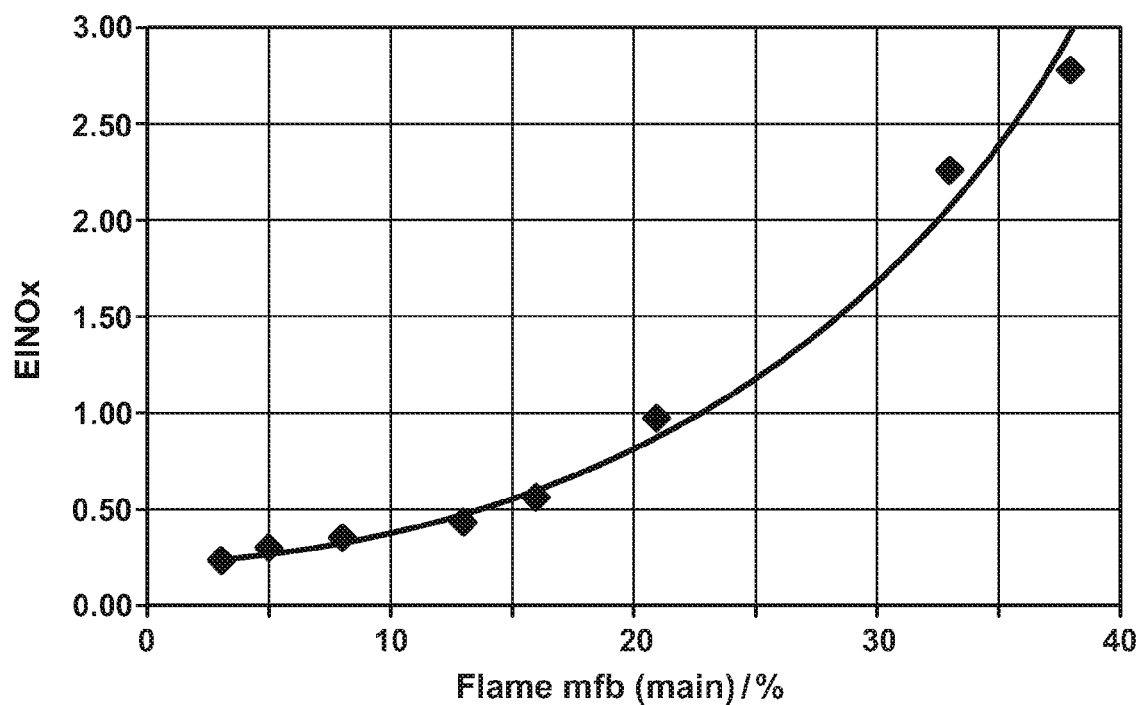
FIG. 8 graphically depicts a correlation between an amount of fuel burned before auto-ignition occurs and NOx emissions produced in the combustion process, in accordance with the present disclosure.
Figure 9:
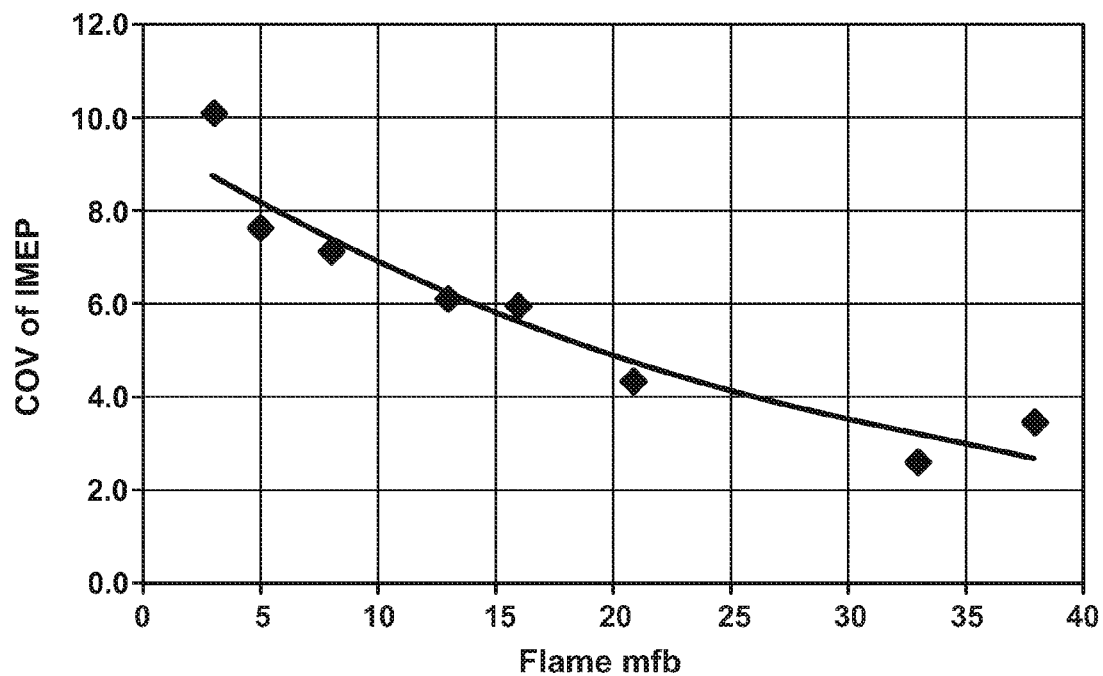
FIG. 9 graphically depicts a correlation between an amount of fuel burned before auto-ignition occurs and combustion stability, in accordance with the present disclosure.

Operation in SI-SG mode, utilizing a spark to create a compression wave within the combustion chamber to facilitate combustion, includes inverse relationships to reforming fuel in HCCI-DI mode. FIG. 9 graphically depicts exemplary data illustrating a relationship between combustion stability and flame propagation associated with SI-SG mode, in accordance with the present disclosure. Flame mass fraction burn (flame mfb) describes the progression of combustion within a combustion cycle at some reference point or reference crank angle. More aggressive timing of the spark ignition in SI-SG mode, initiated earlier in the combustion cycle, results in higher values of flame mass fraction burn. In the exemplary data of FIG. 9, increased flame mass fraction burn results in lower COV of IMEP, describing desirably increased stability. FIG. 8 graphically depicts exemplary data illustrating an inverse relationship between NOx emissions and flame propagation associated with SI-SG mode, in accordance with the present disclosure. Increased flame mass fraction burn results in higher NOx emissions. FIGS. 8 and 9 describe an inverse tradeoff between combustion stability and NOx emissions associated with the SI-SG mode, as compared to the tradeoff described above associated with stability and NOx emissions associated with reforming in the HCCI-DI mode.

Figure 7:
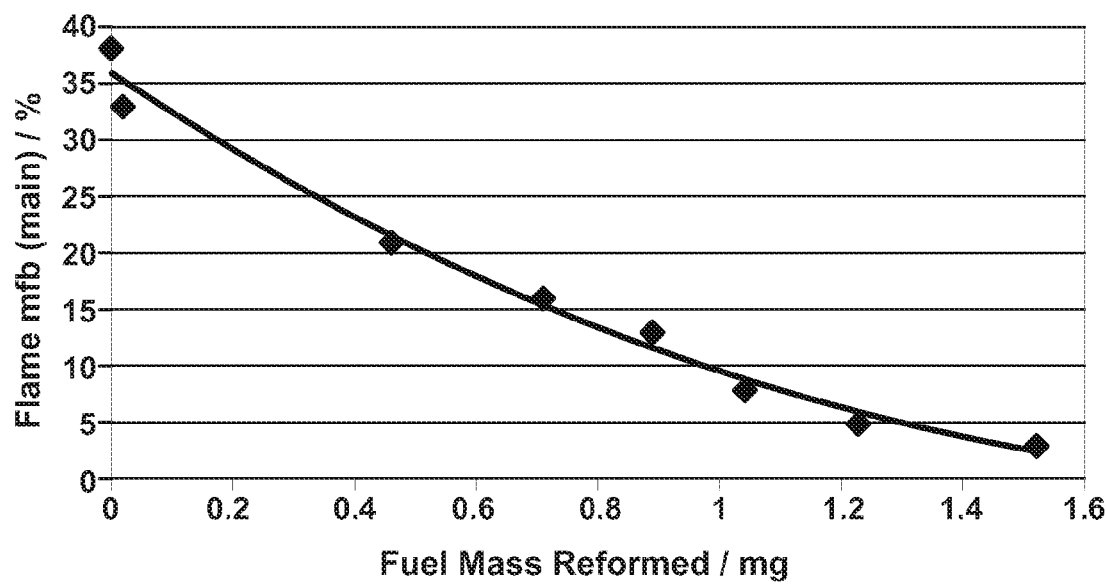
FIG. 7 graphically depicts a correlation between a fuel mass burned during reforming and a need for flame-induced compression during main combustion for triggering auto-ignition, in accordance with the present disclosure.
Figure 10:
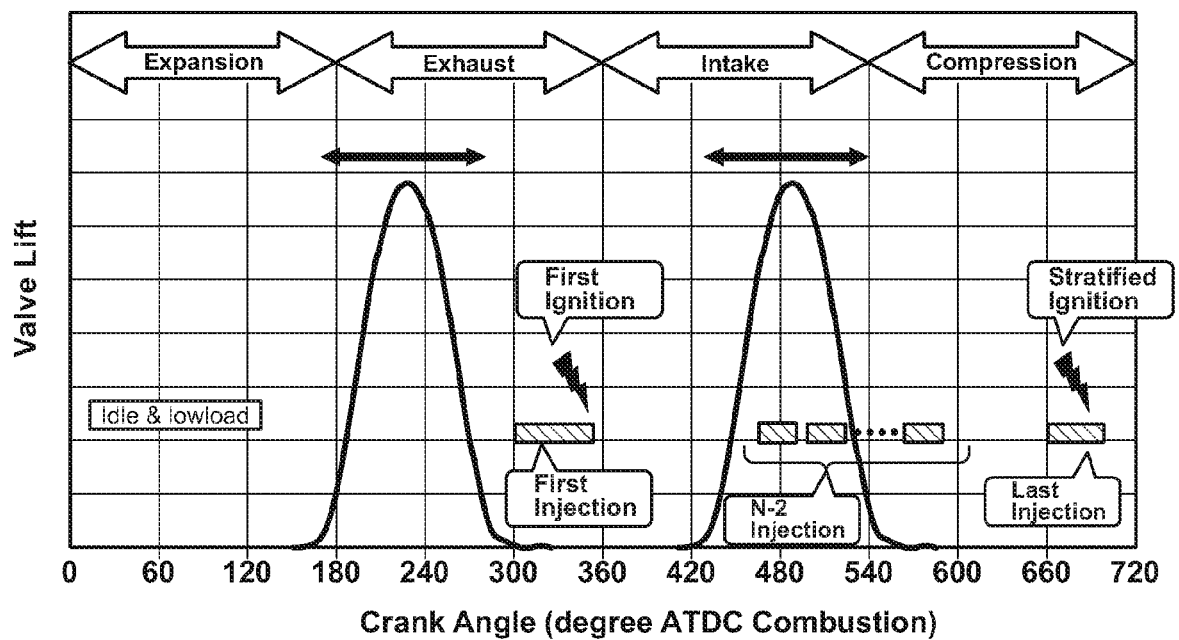
FIG. 10 illustrates an exemplary engine cycle in a four stroke internal combustion engine, operating under an exemplary multi-injection, multi-ignition combustion mode, in accordance with the present disclosure.

As depicted in FIG. 2, operation at low load by methods described herein requires either operation in SI-SG mode, utilizing a spark to create a compression wave within the combustion chamber to facilitate combustion, or HCCI-DI mode, utilizing fuel reforming to increase the heat present within the combustion chamber to trigger auto-ignition. FIG. 7 graphically depicts exemplary data illustrating reforming and advanced combustion timing as initiated by a spark as complimentary methods combining to create stable combustion, in accordance with the present disclosure. Reforming through double injection can be utilized in combination with SI-SG mode in a hybridized mode to selectively operate in accordance with desired stability and NOx targets. More reforming results in less need of flame-induced compression during main combustion for triggering auto-ignition, allowing less aggressive, later timed spark ignition in the SI-SG mode. A method is disclosed, benefiting from the advantages of fuel reforming and flame propagating combustion and achieve better in-cylinder conditions for auto-ignition, wherein the tradeoffs between the modes are balanced and the combustion cycle is operated with both reforming and flame propagation. A preferred method to select the amount of fuel reformed includes that the fuel quantity injected during recompression and the fuel quantity injected for reforming is reduced to a minimum required to achieve a desired output. One method to inject the remainder of fuel required to reach a desired engine work output is graphically depicted in FIG. 10. Fuel can be introduced in one or more injection pulses during the intake stroke or early in the compression stroke for combustion in the main combustion event, and resulting work generated in the main combustion event can be estimated by methods known in the art.

This injection strategy differs from multiple injection strategies for stratified-combustion SIDI engines where all fuel is injected late in the compression stroke and ignited by a single spark discharge. In HCCI engines with lesser restrictions regarding engine emissions and combustion stability or for applications with controller processing limitations, the total amount of injected fuel can be introduced in three or more equal injection quantities or three or more equal injection pulse widths while still benefiting from increased combustion stability and reduced NOx emissions.

In idle and low load conditions, a fixed calibration for each operating condition is not only time consuming but it is not robust for an HCCI combustion process due to the influence of not actively controlled conditions on the auto-ignition process (e.g. fuel composition, thermal history, or combustion chamber deposits, etc.).

Figure 11:
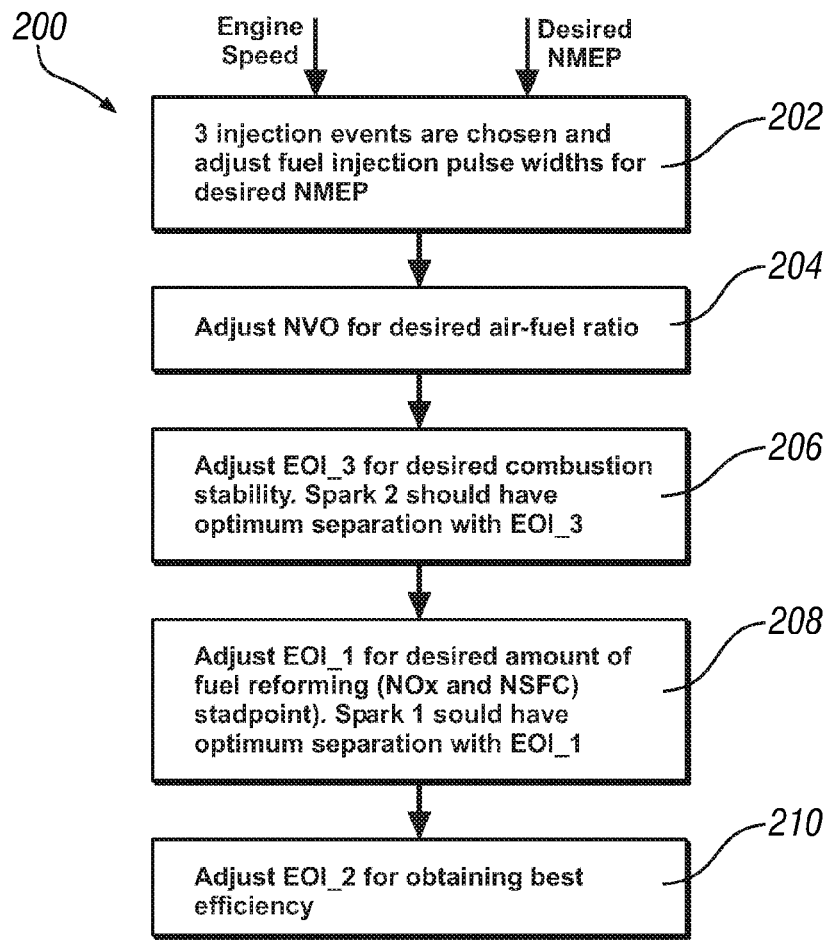
FIG. 11 illustrates an exemplary process whereby multiple injection events can be controlled within an engine cycle, in accordance with the present disclosure.

Using the multiple injection scheme described, an exemplary control strategy for the speed/load range from idle to road load is disclosed. FIG. 11 depicts an exemplary triple injection scheme for selecting engine operating parameters, in accordance with the present disclosure. Control process 200 is described. Inputs related to engine speed and desired engine load are monitored, and three injection events, balancing stability and NOx emissions and delivering required output work, are selected according to methods described herein (202). Fuel injection pulse widths are determined based upon the desired engine output work. Then the NVO is adjusted for the desired air-fuel ratio (204). An injection timing for a flame propagation SI-SG event (EOI_3) is selected based upon required combustion stability (206). A spark timing for the SI-SG flame propagation event is selected based upon the injection timing in 206 and based upon desired fuel mass fraction burn as disclosed herein. Additionally, in 208, an injection timing for a fuel reforming event (EOI_1) is selected based upon predicted NOx emissions, stability, fuel consumption, and the selection of the injection and spark in 206. A spark can additionally be utilized in 208 to aid in the initiation of the reforming process. Finally, an injection timing for the main combustion event (EOI_2) is selected based upon the selected injection and spark timings in steps 206 and 208 and based upon required work output and resulting output efficiency (210). In this way, a plurality of injection and spark timings can be selected and balanced to control a combustion cycle according to parameters described herein.

Figure 12:
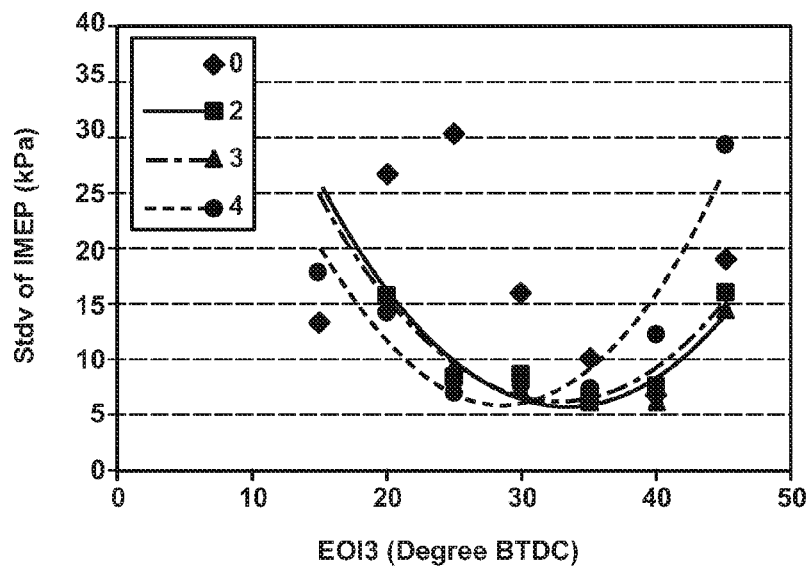
FIG. 12 graphically depicts a correlation between a separation between injection timing and spark timing and combustion stability, in accordance with the present disclosure.

As described in association with FIG. 11, spark timings are selected for use in the combustion cycle. Selection of injection timings and related spark timings are important to operation of the combustion cycle. FIG. 12 graphically depicts exemplary data describing separation between injection timing and associated spark timing for a flame propagation SI-SG event and resulting combustion stability, in accordance with the present disclosure. Combustion stability in the exemplary data is described according to standard deviation of IMEP, with higher values describing lower combustion stability. Four data sets are depicted, describing crank angle degrees of separation between the end of the injection event and the timing of the associated spark. Depending upon the injection timing selected according to methods described herein, a different spark timing related to the injection timing selected can be selected based upon a look-up table or similar method describing the effects of spark timing to combustion stability. It will be appreciated that the data of FIG. 12 are exemplary data for a particular engine configuration, and that similar data can be generated, predicted, or modeled for a different engine configuration by any method sufficient to estimate operation of the combustion cycle.

Figure 13:
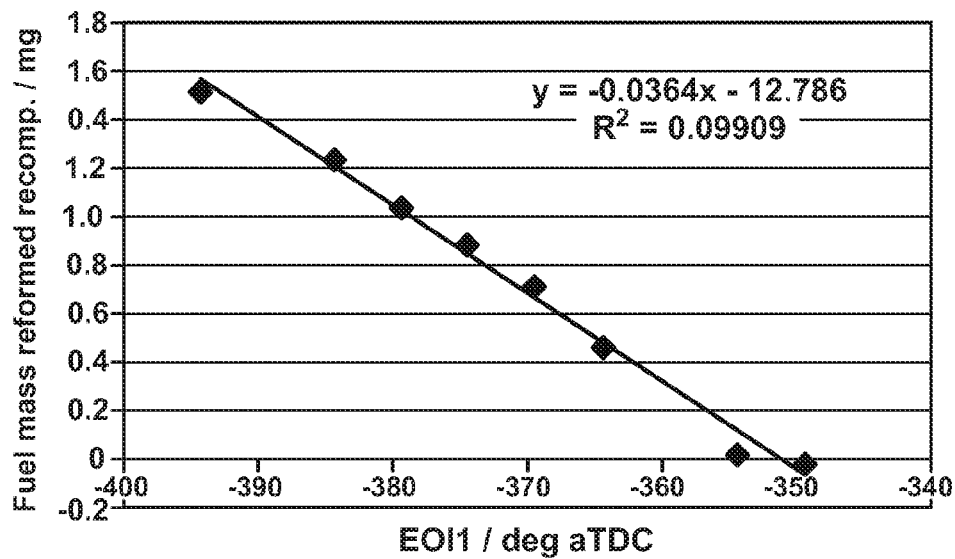
FIG. 13 graphically depicts an observed relationship between a first pulse fuel injection timing and a fuel mass burned during reforming, allowing for fuel injection timing of the first injection to be adjusted for a desired amount of fuel reforming, in accordance with the present disclosure.
Figure 14:
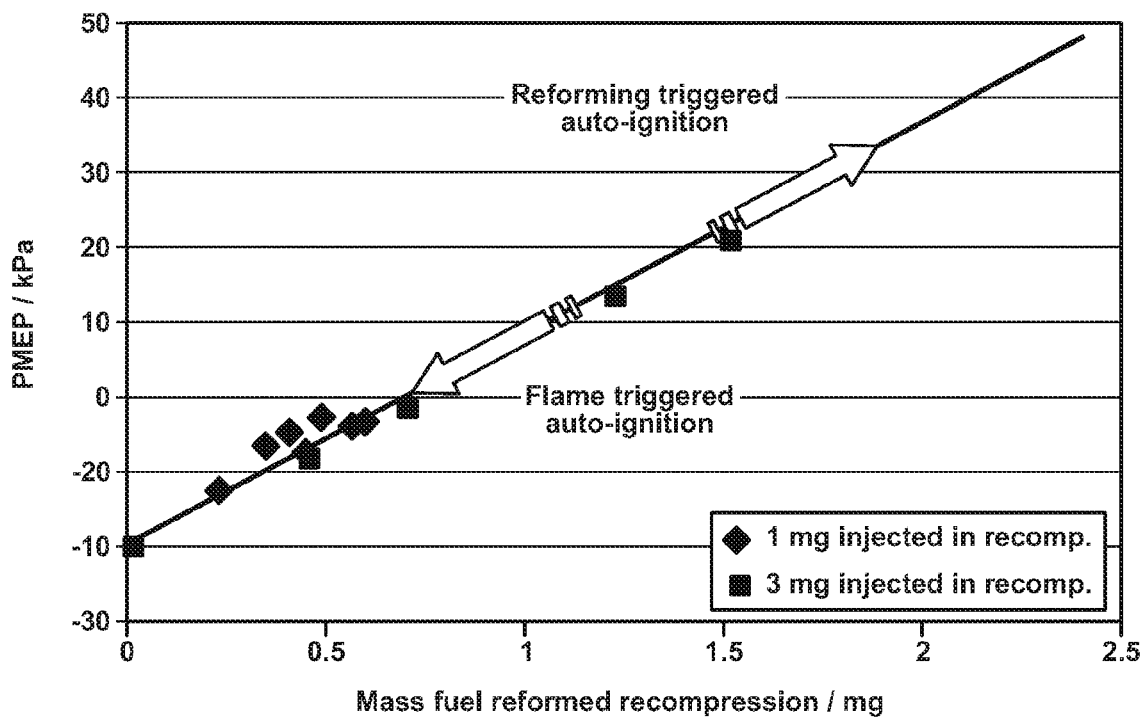
FIG. 14 graphically depicts a correlation between a fuel mass reformed during recompression and cylinder pressures, enabling a method to monitor the reforming process through monitoring cylinder pressure measurements, in accordance with the present disclosure.

FIG. 13 graphically depicts exemplary data describing a relationship between fuel mass reformed in the recompression period of a combustion cycle and the timing of the associated fuel injection, in accordance with the present disclosure. This relationship allows for the fuel injection timing of the first injection to be utilized to control the desired amount of fuel reforming. Alternatively, the fuel mass that is reformed during recompression can be monitored. FIG. 14 graphically illustrates an exemplary relationship between measured in-cylinder pressures and fuel mass reformed during recompression, in accordance with the present disclosure. Any such exemplary method to monitor and estimate effects of reforming can be used for the adjustment or feedback control of the fuel mass reformed.

Figure 15:
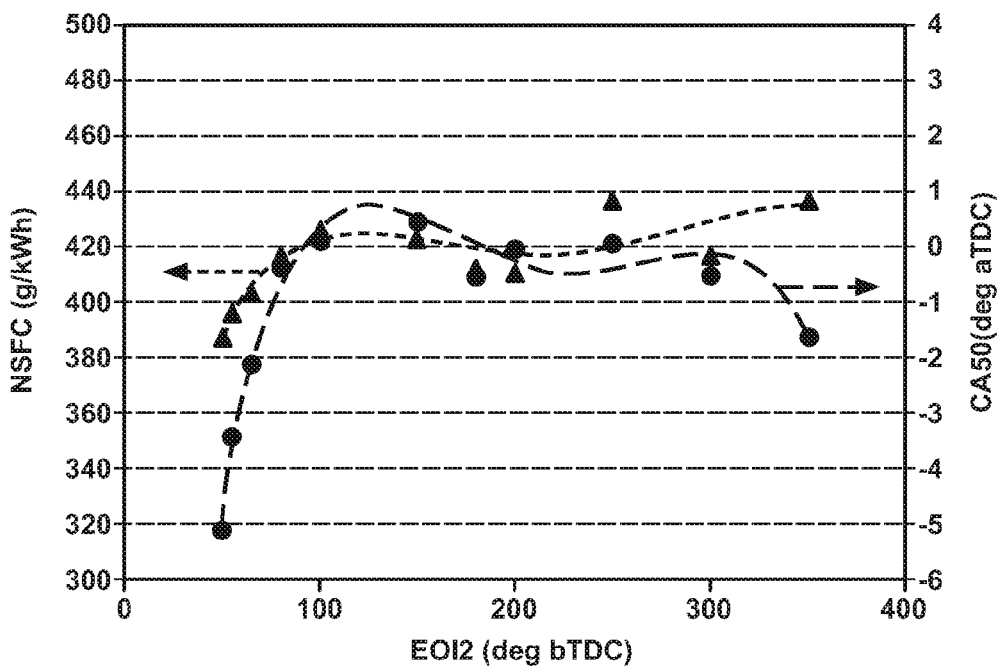
FIG. 15 graphically depicts a correlation between a second pulse fuel injection timing and fuel efficiency and combustion phasing, in accordance with the present disclosure.

Once injections associated with reforming and flame propagation are set, then a fuel injection or injections must be selected to deliver the required work output that must be delivered through the main combustion event. Fuel efficiency and combustion phasing are important criteria to controlling the main combustion event. FIG. 15 graphically depicts an exemplary correlation between injection timing and efficiency and timing of the main combustion event, in accordance with the present disclosure. Such calibration curves, determining an effect of injection timing to combustion properties are well known in the art and will be different for different particular engine configurations.

As described above, multiple-injection, multiple-ignition combustion modes allow for desired engine operation through operating ranges not conducive to traditional HCCI-SI and avoiding drawbacks of known two injections per engine cycle per cylinder strategies. By utilizing multiple-injections and multiple-ignitions in connection with SI-SG and HCCI combustion modes and selecting particular strategies within these modes, different benefits and drawbacks known to exist with particular parameters can be managed in order to control combustion. Additionally, discrete modes can be defined in order to reduce computational and monitoring burdens that would be imposed by continuously adjusting engine parameters within combustion modes. Therefore, an exemplary method is disclosed to control a multiple-injection, multiple-ignition combustion mode comprising at least three injection events, wherein three different modes within the multiple-injection, multiple-ignition combustion mode are identified and selected based upon engine speed and load.

In one exemplary embodiment of the disclosure, and in order to remove certain complexity in such control scheme, a multiple-injection, multiple-ignition strategy with equal pulse width is employed.

In a first multiple-injection, multiple-ignition combustion mode, at low speed and low load including idle when combustion cycles get cold, a three injection event, multiple-ignition combustion mode as described above in relation to FIG. 10 is utilized, which is a combination of auto-ignition and spray-guided stratified combustion. The injection and ignition timing in the recompression are adjusted for the desired amount of fuel reforming. The timing of the injection and ignition in the main compression are adjusted to achieve the desired combustion stability by through robust spray-guided stratified combustion. The remainder of the fuel that is needed to reach a desired engine work output can be introduced during the intake stroke to achieve the best fuel efficiency and to arrive at the desired combustion phasing.

In a second multiple-injection, multiple-ignition combustion mode, as engine speed and load increases, NOx and soot formation increase due to increasing adverse effects of spray-guided stratified combustion. At medium speed and load range, a wide separation triple injection strategy can be implemented. The injection timing and ignition timing during the recompression are adjusted to achieve a desired amount of reforming. Temperature at intake valve closure can be increased by reforming, which enhances the robustness of HCCI combustion. The timing of the injection and ignition during main compression are adjusted to reduce as much spray-guided stratified combustion as possible while maintaining combustion stability. The remainder of the fuel that is needed to reach a desired engine work output can be introduced during the intake stroke to boost the beginning of HCCI combustion.

In a third multiple-injection, multiple-ignition combustion mode, as engine speed and load further increase, even a small proportion of spray-guided stratified combustion can generate significant NOx emissions. Moreover, too much reforming can hurt combustion stability and engine efficiency. At high speed and high load, a close separation triple injection strategy is employed. All three injection and ignition timings are selected considering efficiency and combustion phasing. Separation is preferably determined based on NOx emissions, combustion stability and soot emissions.

Figure 16:
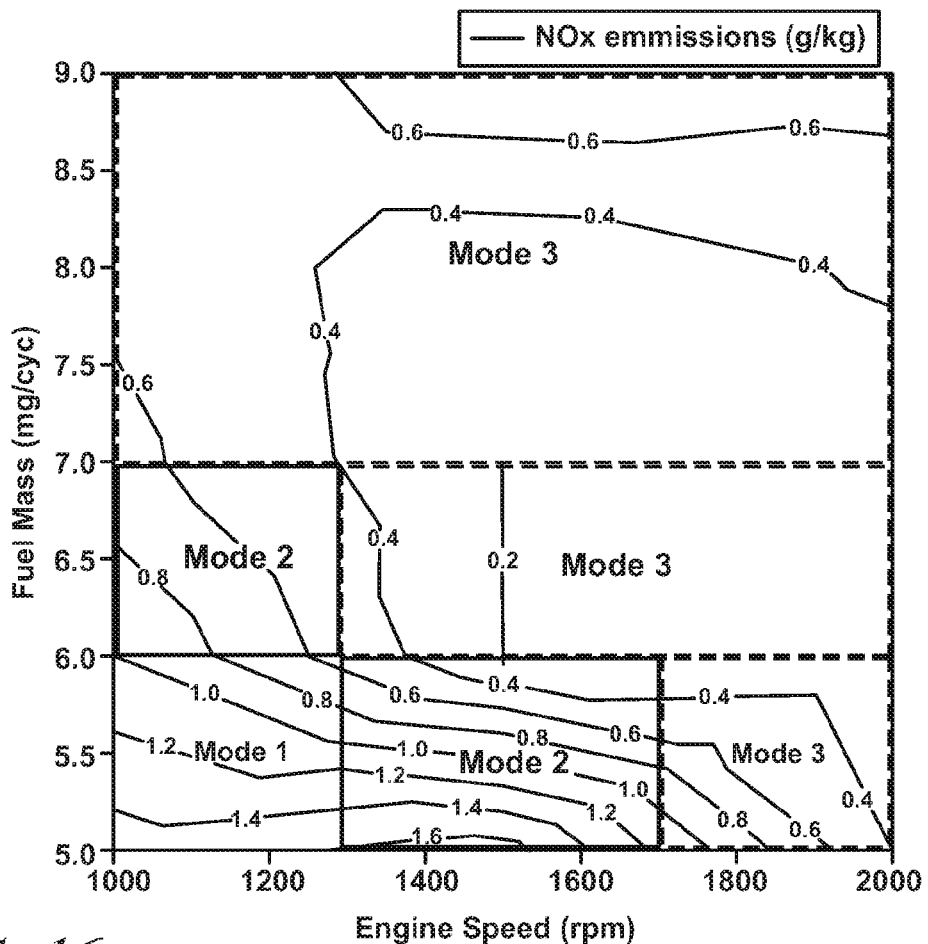
FIGS. 16 and 17 graphically illustrate application of three exemplary multiple-injection, multiple-ignition combustion modes and exemplary test results generated detailing impacts to NOx emissions and combustion stability, in accordance with the present disclosure.
Figure 17:
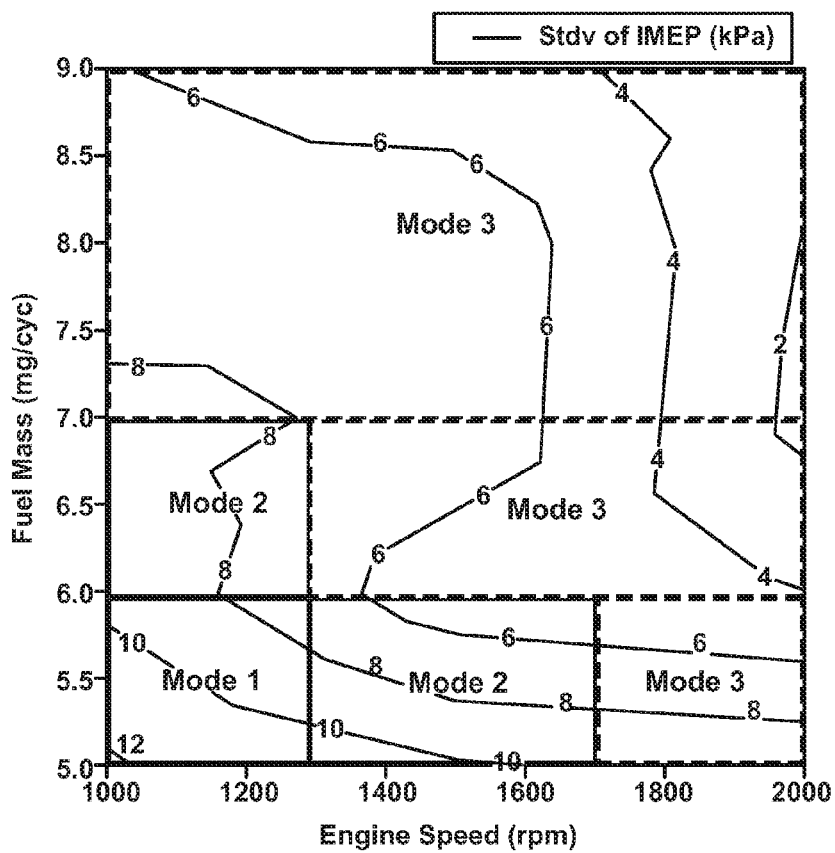

FIGS. 16 and 17 graphically illustrate application of the three multiple-injection, multiple-ignition combustion modes described herein and exemplary test results generated detailing impacts to NOx emissions and combustion stability, in accordance with the present disclosure. The borders delineating the regions wherein the three modes where operated are exemplary only. These regions in a particular engine may be developed experimentally, empirically, predictively, through modeling or other techniques adequate to accurately reflect engine operation, and a multitude of regional definitions might be used by the same engine for each cylinder and for different engine settings, conditions, or operating ranges. FIG. 16 more particularly illustrates test data as lines of constant NOx emissions for a range of engine speeds and loads, with regions defined for a first, second, and third multiple-injection, multiple-ignition combustion mode, as described above. FIG. 17 more particularly illustrates test data as lines of constant combustion stability as measured by standard deviation of IMEP for a range of engine speeds and loads, with regions defined for a first, second, and third multiple-injection, multiple-ignition combustion mode, as described above. The data within FIGS. 16 and 17 illustrate a selection of regions within a range of engine operation and resulting engine performance factors that can be analyzed and calibrated.

As described above and especially in relation to FIG. 3, engine performance compromises are inherent to switching between SI-SG and HCCI modes. The methodology described in relation to FIG. 3 can be applied to the above described method to switch between the three operating modes in order to reduce adverse effects to engine operation and vehicle drivability resulting from the switches.

As described above, HCCI operation provides benefits in terms of fuel efficiency and low NOx emissions. However, as described above, HCCI combustion and the associated auto-ignition has limits at low engine loads and speeds, wherein a lack of energy or heat in the combustion chamber results in the compressed air fuel charge not reaching a threshold auto-ignition condition. Flame propagation through SI-SG mode, described above, provides a pressure wave within the combustion chamber, increasing available energy within the chamber and aiding in the ignition of the charge. Combustion stability of light load HCCI combustion, in particular in association with the hybrid mode described above, is closely related with the robustness of SI-SG combustion. It will be appreciated that the particular configuration of the injected spray of fuel, the orientation of the fuel spray to the associated spark source, and the timing of the spark to the spray are important to generating an effective flame front to accomplish the auto-ignition desired of the SI-SG mode. These factors combine to provide an air fuel mixture near the spark plug, preferably locally close to stoichiometric AFR, conducive to creating an optimized pressure front within the chamber. Testing has shown that in addition to these factors, fuel pressure implemented to inject the fuel into the chamber has an impact upon combustion stability at low loads. By utilizing flame propagation, stability of low load operation in an HCCI mode can be improved. Such operation can be termed an HCCI flame propagation assisted mode.

Figure 18:
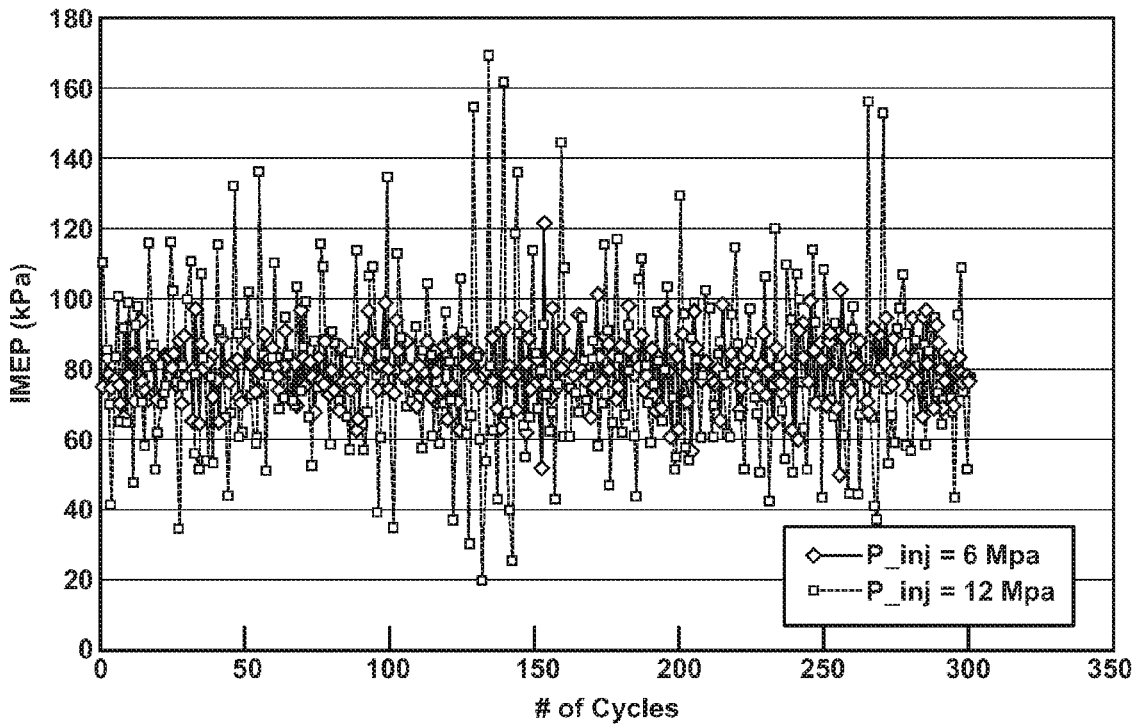
FIG. 18 graphically depicts exemplary in-cylinder pressures measured through sequential combustion cycles at low engine load and low engine speed utilizing different injection pressures, in accordance with the present disclosure.

FIG. 18 graphically depicts exemplary in-cylinder pressures measured through sequential combustion cycles at low engine load and low engine speed utilizing different injection pressures, in accordance with the present disclosure. The graph displays results of IMEP changes through 300 cycles between high injection pressure and low injection pressure obtained at 850 rpm, 85 kPa NMEP. The high pressure utilized comprises a fuel pressure at which the fuel injection system may be operated at through normal engine operation. The low pressure utilized comprises a fuel pressure below a normal operating fuel pressure, and under normal operation of the engine, such low pressure is typically avoided in some exemplary configurations due to excessive soot resulting from the combustion process at normal engine speeds and loads. As is evident in the data, in-cylinder pressures resulting from combustion with low pressure fuel injection consistently exhibit lower variance, with IMEP values centering with lower deviation around a stable value, than pressures resulting from combustion with high pressure fuel injection. Lower variability in in-cylinder pressures corresponds to higher combustion stability.

Figure 19:
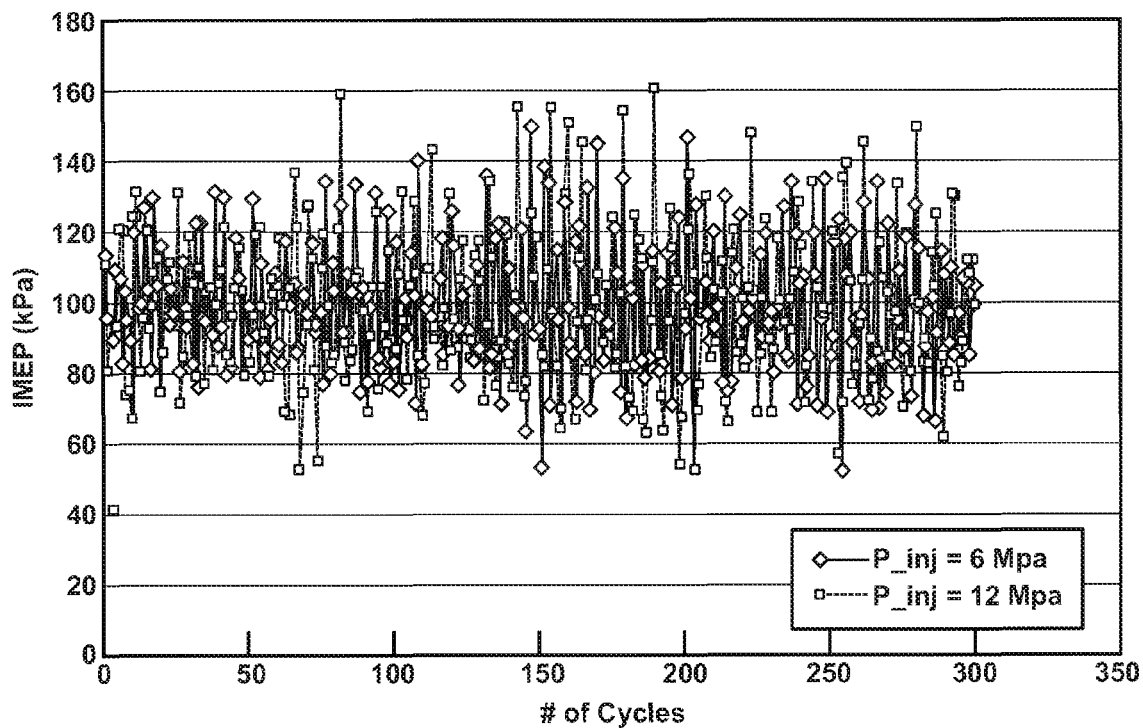
FIG. 19 graphically depicts exemplary PMEP measured through sequential combustion cycles at low engine load and low engine speed utilizing different injection pressures, in accordance with the present disclosure.

Additionally, more stabilized PMEP is evident at low injection pressure, resulting in more consistent fuel mass reformed. FIG. 19 graphically depicts exemplary PMEP measured through sequential combustion cycles at low engine load and low engine speed utilizing different injection pressures, in accordance with the present disclosure. PMEP, as a measure of pumping work performed by the cylinder through the combustion cycle, can be used as a measure of the dynamics acting upon the charge through the cycle. More consistent pressures and dynamic forces upon the charge result in more consistent reforming through the combustion cycle. As is evident in the data, PMEP resulting from combustion with low pressure fuel injection consistently exhibit lower variance, with values centering with lower deviation around a stable value, than pressures resulting from combustion with high pressure fuel injection.

Figure 20:
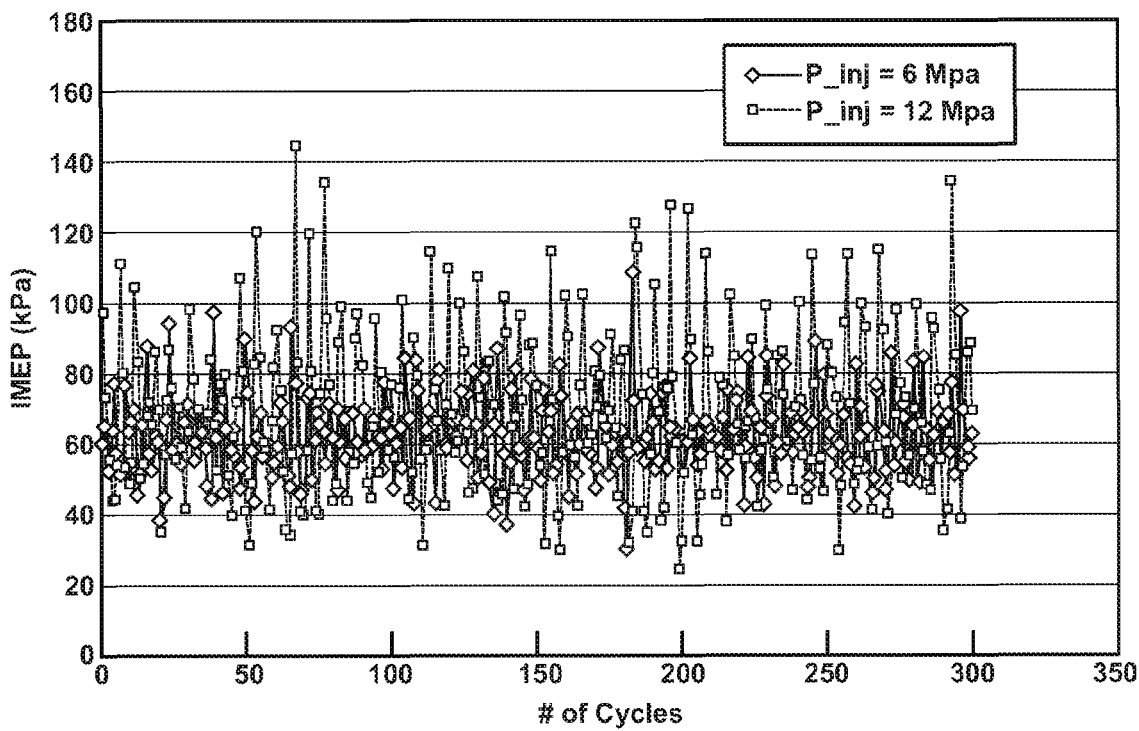
FIGS. 20 and 21 graphically illustrate exemplary data of an engine operating at speeds near the high end of an HCCI operating range and at low load, in accordance with the present disclosure.
Figure 21:
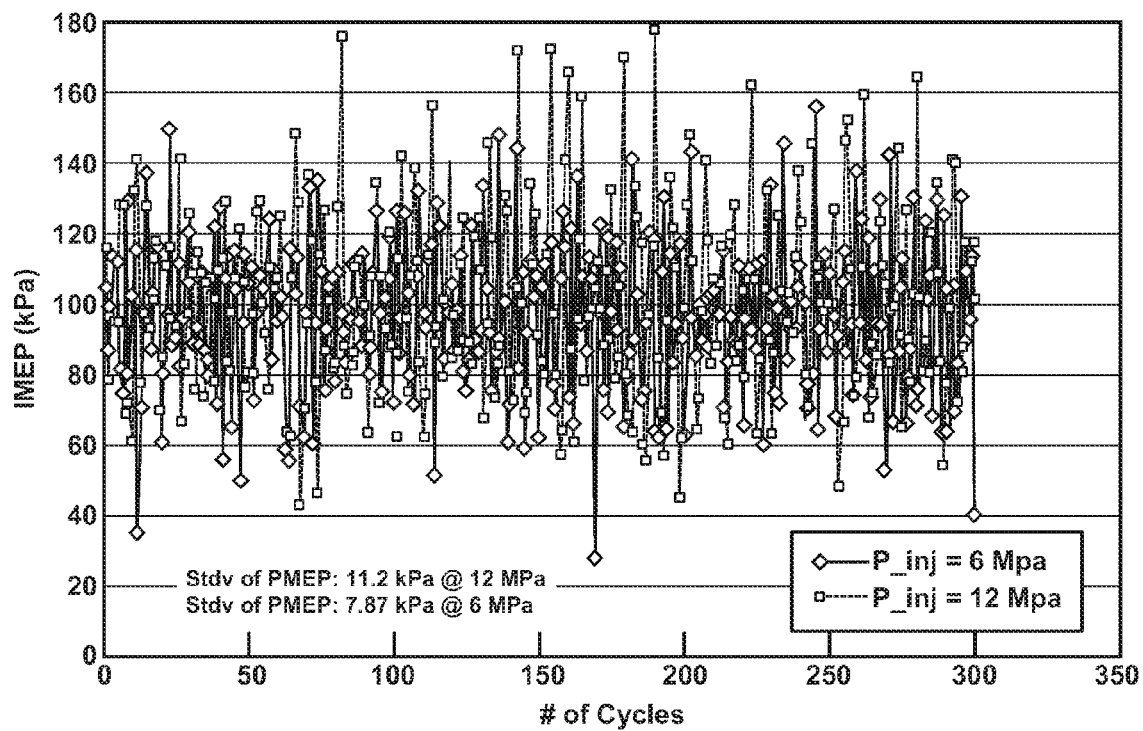

Another benefit of low injection pressure is further extension the limit of light load HCCI combustion. Improved combustion stability as a result of low injection pressures at low engine speeds and loads continues to be exhibited at higher engine speeds and low engine loads. FIGS. 20 and 21 graphically illustrate exemplary data of an engine operating at speeds near the high end of an HCCI operating range and at low load, in accordance with the present disclosure. The exemplary data of FIGS. 20 and 21 were collected during testing at 1000 rpm, 35 kPa NMEP. FIG. 20 graphically depicts exemplary in-cylinder pressures measured through sequential combustion cycles at low engine load utilizing different injection pressures. FIG. 21 graphically depicts exemplary PMEP measured through sequential combustion cycles at low engine load utilizing different injection pressures. An examination of IMEP and PMEP in FIGS. 20 and 21 illustrates lower variability in both indicators, describing both improved combustion stability and improved stability in reforming, as described above in association with FIGS. 18 and 19.

Figure 22:
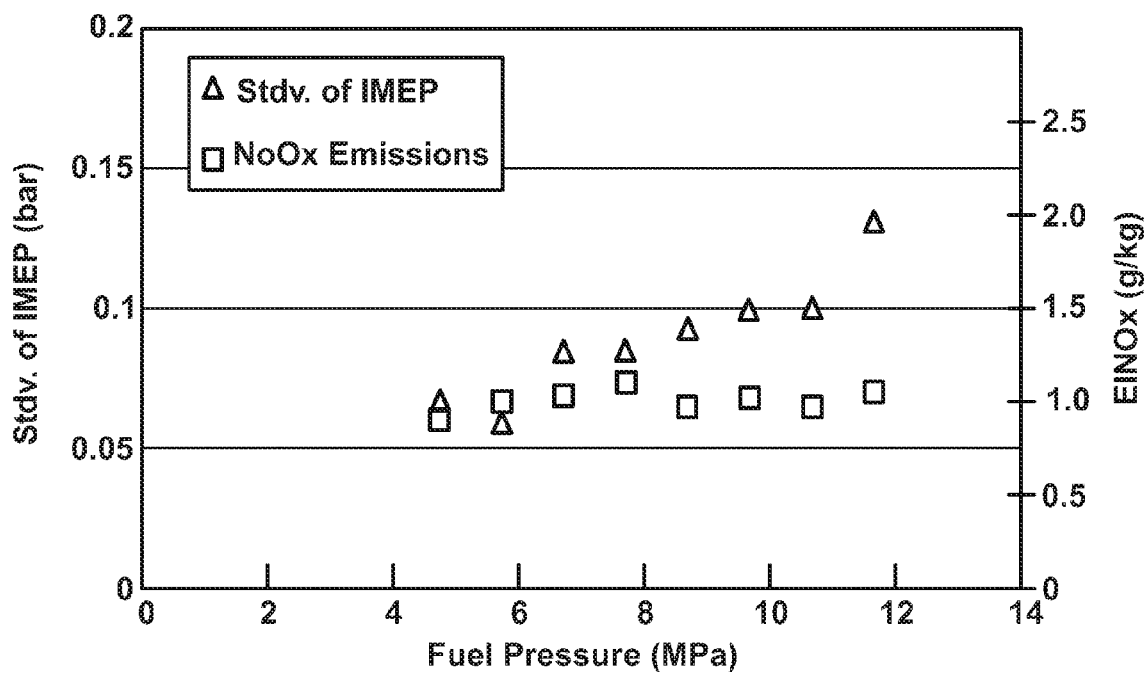
FIG. 22 graphically depicts exemplary test results describing an engine under cold start conditions and illustrating NOx emissions and combustion stability for varying fuel injection pressures, in accordance with the present disclosure.

Another benefit of low injection pressure is further extension the limit of light load HCCI combustion during cold engine conditions. FIG. 22 graphically depicts exemplary test results describing an engine under cold start conditions and illustrating NOx emissions and combustion stability for varying fuel injection pressures, in accordance with the present disclosure. Test conditions utilized to generate the exemplary data included an engine speed of 800 RPM, 120 kPa NMEP, and 25° C. coolant temperature. As is evident in the data, NOx emissions remain relatively unchanged through the range of fuel pressures, and standard deviation of IMEP decreases with decreasing fuel injection pressure, indicating improved combustion stability at lower fuel injection pressure. In this way, modulating fuel injection pressure can be utilized to increase combustion stability at low load during warm-up conditions.

As described above, low injection pressure is known to increase soot emissions. As engine load increases, high soot emissions were obtained at low injection pressure. An increase in soot emissions can be avoided by limiting use of low injection pressure strategy to only a limited region, where lean operation is implemented such as in engine idle conditions and operation at light load. A method is disclosed to modulate fuel injection pressure based upon engine load and engine speed, enabling use of low fuel injection pressures at low engine loads and appropriate engine speeds, and using high fuel injection pressures in operating ranges wherein soot emissions are problematic.

Figure 23:
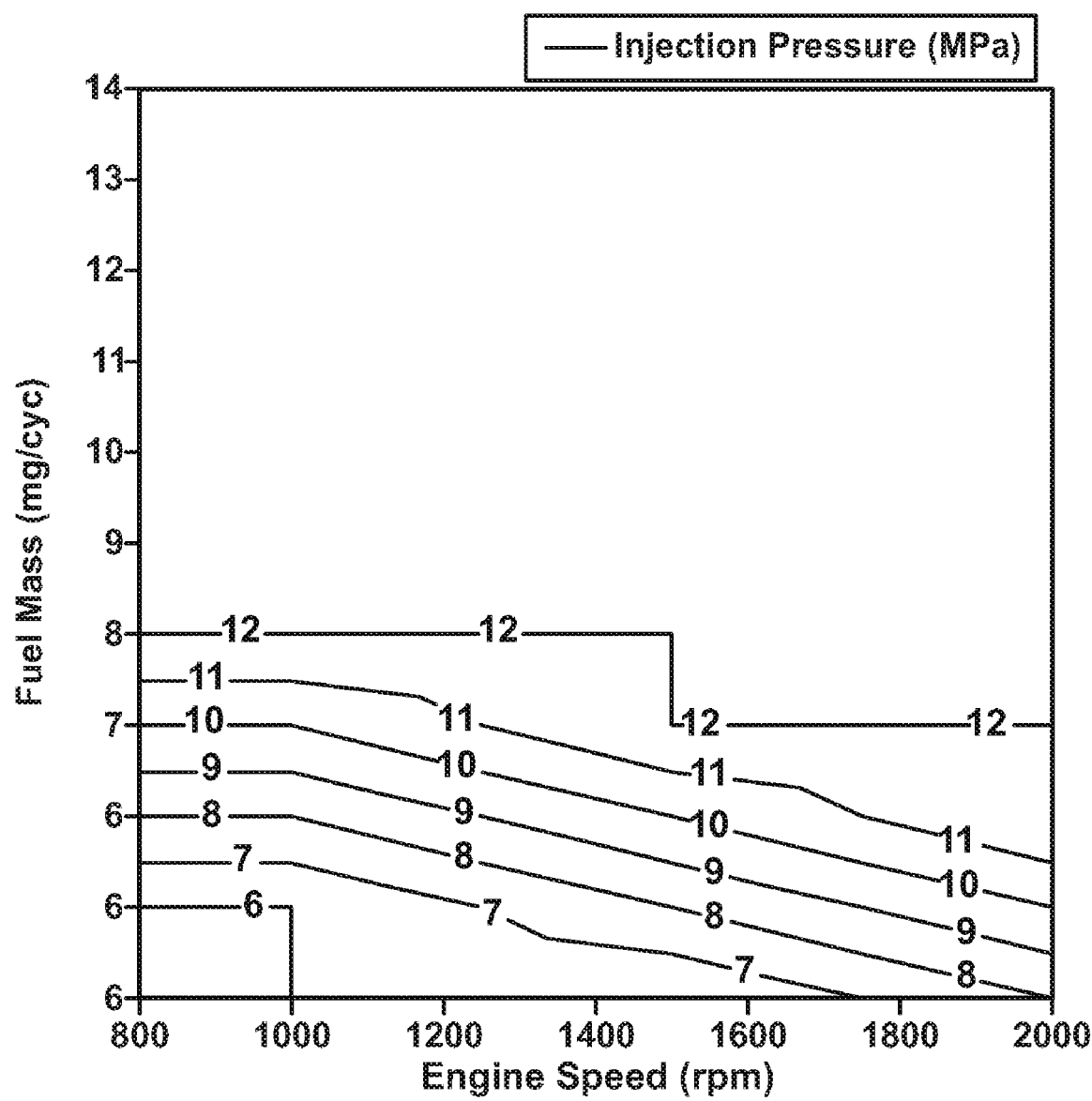
FIG. 23 graphically depicts an exemplary injection pressure strategy, wherein injection pressure is modulated through a range of engine speeds and engine loads, in accordance with the present disclosure.

Engine loads and speeds wherein low fuel pressures can be utilized to improve combustion and reforming stability can be fixed regions, wherein low pressure operation is either enabled or disabled, based upon testing, predictions, or modeling predicting operation of the engine and associated soot emissions. In this binary control method, a desired fuel pressure used for injection is modulated to either high or low pressure, with the particular high and low pressures being selected according to engine operation and calibration. In the alternative, the binary pressure settings or the operating ranges in which the pressure settings are operated can be modulated based upon an ambient temperature, fuel type, or any other determinable factors that affect combustion and resulting stability. Further, multiple fuel pressures can be selected from, with each fuel pressure being assigned engine speed and load operating ranges for operation based upon engine operation and soot emissions. Multiple fuel pressures can include a high pressure, a low pressure, and an intermediate pressure or a plurality of intermediate pressures. Further, the desired fuel pressure can be a low fuel pressure range scaled between a high and a low value depending upon engine speed and engine load. FIG. 23 graphically depicts an exemplary injection pressure strategy, wherein injection pressure is modulated through a range of engine speeds and engine loads, in accordance with the present disclosure. Engine load is depicted as a fuel mass combusted per combustion cycle. Data lines on the graph illustrate a desired fuel pressure that can be commanded for an engine speed and an engine load. Fuel pressure is operated at a low pressure within a defined low engine speed and low engine load range. As engine speeds and loads increase, so does the desired injection pressure, thereby avoiding soot generation at the higher loads. Such a graph can be embodied in a control module through a look-up table, programmed logic, or in an on-board model sufficient to predict engine operation. As described above, the fuel pressures and the particular operating ranges are variable depending upon the particular engine configuration. Values and ranges may be developed experimentally, empirically, predictively, through modeling or other techniques adequate to accurately predict engine operation, and a multitude of calibration curves might be used by the same engine for each cylinder and for different engine settings, conditions, or operating ranges.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a spark-ignited, direct injection, homogeneous-charge compression-ignition capable, internal combustion engine operating with spray-guided spark ignition stratified combustion at low load, including selectively utilizing lowered injected fuel pressure in a fuel injection system to increase combustion stability, said method comprising:
monitoring a speed of the engine;
monitoring a load of the engine;
determining a desired injected fuel pressure based upon the speed of the engine and the load of the engine; and
utilizing the desired injected fuel pressure to control fuel injection into the engine;
wherein the desired injected fuel pressure is calibrated to the speed and the load based upon increased combustion stability of the engine corresponding to lower variability in in-cylinder pressures at lower injected fuel pressures and lower soot emissions from the engine at higher injected fuel pressures.

2. The method of claim 1, wherein the desired injected fuel pressure is further calibrated according to a high injected fuel pressure and a low injected fuel pressure.

3. The method of claim 2, wherein the desired injected fuel pressure is further calibrated to an intermediate value selected between the high injected fuel pressure and the low injected fuel pressure.

4. The method of claim 2, wherein the desired injected fuel pressure is further calibrated to intermediate values selected between the high injected fuel pressure and the low injected fuel pressure.

5. The method of claim 1, wherein the desired injected fuel pressure is further calibrated to be a scaleable value set to a high injected fuel pressure, a low injected fuel pressure, or a value between the high injected fuel pressure and the low injected fuel pressure.

6. The method of claim 1, wherein determining the desired injected fuel pressure based upon the speed of the engine and the load of the engine comprises setting the desired injected fuel pressure to a low injected fuel pressure range when the speed of the engine is in a low speed range and when the load of the engine is in a low load range.

7. The method of claim 6, wherein the low speed range and the low load range comprise an engine idle setting.

8. The method of claim 6, wherein determining the desired injected fuel pressure based upon the speed of the engine and the load of the engine further comprises setting the desired injected fuel pressure to the low injected fuel pressure range when the load of the engine is in a low load range and when the speed of the engine and the load of the engine comprise a homogeneous charge compression ignition capable range.

9. The method of claim 1, wherein determining the desired injected fuel pressure based upon the speed of the engine and the load of the engine is further based upon a fuel type.

10. The method of claim 1, wherein determining the desired injected fuel pressure based upon the speed of the engine and the load of the engine is further based upon an ambient temperature.

11. Method for controlling a spark-ignited, direct injection internal combustion engine utilizing multiple injection flame propagation to extend operation in homogeneous-charge compression-ignition mode at low engine load, said method comprising:
monitoring a speed of the engine;
monitoring a load of the engine;
selectively operating the engine in a homogeneous-charge compression-ignition flame propagation assisted mode based upon the monitored speed and the monitored load indicating the engine is in a homogeneous-charge compression-ignition low stability region of operation, the homogeneous-charge compression-ignition flame propagation assisted mode comprising:
determining a desired injected fuel pressure calibrated to the monitored speed and the monitored load based upon increased combustion stability of the engine corresponding to lower variability in in-cylinder pressures at lower injected fuel pressures and lower soot emissions from the engine at higher injected fuel pressures; and
utilizing the desired injected fuel pressure to control fuel injection into the engine.

12. The method of claim 11, wherein the desired injected fuel pressure is further calibrated according to a high injected fuel pressure and a low injected fuel pressure.

13. The method of claim 12, wherein the desired injected fuel pressure is further calibrated according to a scaleable value equaling the high injected fuel pressure, the low injected fuel pressure, or a value between the high injected fuel pressure and the low injected fuel pressure.

14. The method of claim 11, wherein indicating the engine is in a homogeneous-charge compression-ignition low stability region of operation comprises determining the engine is at an idle condition.

15. Apparatus for controlling a spark-ignited, direct injection, homogeneous-charge compression-ignition capable, internal combustion engine operating at low load, including selectively utilizing lowered injected fuel pressure in a fuel injection system to increase combustion stability, said apparatus comprising:

the engine operating in a homogeneous-charge compression-ignition flame propagation assisted mode;

the fuel injection system providing fuel to the engine at a variable injected fuel pressure;

a controller monitoring a speed of the engine, monitoring a load of the engine, commanding a desired injected fuel pressure calibrated to the speed and the load based upon increased combustion stability of the engine corresponding to lower variability in in-cylinder pressures at lower injected fuel pressures and lower soot emissions from the engine at higher injected fuel pressures.

16. The apparatus of claim 15, wherein the controller commanding a desired injected fuel pressure comprises the controller commanding a higher, normal injected fuel pressure and a lower injected fuel pressure.

17. The apparatus of claim 15, wherein the controller commanding the desired injected fuel pressure comprises the controller commanding a scalable fuel pressure in a range including a higher, normal injected fuel pressure and a lower injected fuel pressure.

* * * * *